US006963959B2

(12) United States Patent
Hsu et al.

(10) Patent No.: US 6,963,959 B2
(45) Date of Patent: Nov. 8, 2005

(54) STORAGE SYSTEM AND METHOD FOR REORGANIZING DATA TO IMPROVE PREFETCH EFFECTIVENESS AND REDUCE SEEK DISTANCE

(75) Inventors: Windsor Wee Sun Hsu, San Jose, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 10/286,485

(22) Filed: Oct. 31, 2002

(65) Prior Publication Data

US 2004/0088504 A1 May 6, 2004

(51) Int. Cl.[7] .............................................. G06F 12/00
(52) U.S. Cl. ...................................... 711/165; 711/111
(58) Field of Search .......................... 711/111–114, 165

(56) References Cited

U.S. PATENT DOCUMENTS

| 5,416,915 | A | | 5/1995 | Mattson et al. | |
|---|---|---|---|---|---|
| 5,956,750 | A | * | 9/1999 | Yamamoto et al. | ......... 711/167 |
| 6,092,149 | A | | 7/2000 | Hicken et al. | |
| 6,189,071 | B1 | | 2/2001 | Bachmat | |
| 6,301,629 | B1 | | 10/2001 | Sastri et al. | |
| 6,339,811 | B1 | | 1/2002 | Gaertner et al. | |
| 6,826,668 | B1 | * | 11/2004 | Hsu et al. | .................. 711/167 |
| 2003/0061352 | A1 | * | 3/2003 | Bohrer et al. | ................ 709/226 |

FOREIGN PATENT DOCUMENTS

JP          62242249 A       10/1987

OTHER PUBLICATIONS

"The Interaction of Software Prefetching with ILP Processors in Shared–Memory Systems" by Parthasarathy Ranganathan et al., Proceedings of the 24th Annual Symposium on Computer Architecture, pp. 144–156, Jun., 1997.
Profile Guided File System Restructuring—IBM Technical Disclosure Bulletin, vol. 39, No. 01, Jan. 1996.
"A Cost–Benefit Scheme for High Performance Predictive Prefetching" by Vivekanand Vellanki et al. Proceedings of SC99: High Performance Networking and Computing, 1999.
"ARIMA Time Series Modeling and Forecasting for Adaptive I/O Prefetching" by Nancy Tran et. al. 15th ACM International Conference on Supercomputing, Jun. 2001 pp. 473–485.

* cited by examiner

*Primary Examiner*—Matthew Kim
*Assistant Examiner*—Woo H. Choi
(74) *Attorney, Agent, or Firm*—Khanh Q. Tran; Mark C. McCabe

(57) ABSTRACT

A data storage system and method for reorganizing data to improve the effectiveness of data prefetching and reduce the data seek distance. A data reorganization region is allocated in which data is reorganized to service future requests for data. Sequences of data units that have been repeatedly requested are determined from a request stream, preferably using a graph where each vertex of the graph represents a requested data unit and each edge represents that a destination unit is requested shortly after a source unit the frequency of this occurrence. The most frequently requested data units are also determined from the request stream. The determined data is copied into the reorganization region and reorganized according to the determined sequences and most frequently requested units. The reorganized data might then be used to service future requests for data.

12 Claims, 10 Drawing Sheets

Sequence A, C, E

Sequence A, C, E, F

Sequence A, C, E, F, Z, J, A, E, F, J

STORAGE SYSTEM AND METHOD FOR REORGANIZING DATA TO IMPROVE PREFETCH EFFECTIVENESS AND REDUCE SEEK DISTANCE

TECHNICAL FIELD

This invention relates to computer storage systems, and more particularly to a storage system and method for reorganizing data to improve the effectiveness of data prefetching and to reduce data seek distance.

BACKGROUND OF THE INVENTION

The slow mechanical nature of input/output (I/O) devices such as disks compared to the speed of electronic processing has made I/O a major bottleneck in computer systems. As the improvement in processor performance continues to far exceed the improvement in disk access time, the I/O bottleneck is becoming more significant. It is therefore necessary to find effective techniques to improve I/O performance. One possible approach for increasing effective disk performance is to find ways to reorganize data blocks on a disk based on the anticipation as to which data blocks are likely to be accessed together by the users. Typically, groups of data blocks are accessed together in a generally predictable manner. Thus, data blocks that are accessed contemporaneously might be laid out close together on the disk so that the delay associated with moving the read/write head is minimized.

Previous attempts at block reorganization have concentrated on identifying data items (data blocks, disk cylinders, or data files) that are accessed frequently, i.e., hot, and then packing these items together based on their frequency of access (referred to as heat) so that as much heat is clustered into as small a storage region as possible. See, for example, U.S. Pat. No. 5,765,204, "Method and Apparatus for Adaptive Localization of Frequently Accessed, Randomly Addressed Data."

FIG. 1 illustrates the data blocks 10 on a disk and their typical frequency of access without being reorganized. The rows of squares in FIG. 1 represent the data blocks laid out on the disk, where the block at the extreme right of the first row is located immediately before the block at the extreme left of the second row and so on. The dark blocks, like block 11, are most frequently accessed by the users. The dotted blocks, like block 13, are next frequently accessed by the users, but less so than the dark blocks. The slashed blocks, like block 12, are also frequently accessed by the users, but less than the dotted blocks.

FIG. 2 illustrates a prior art reorganization of the data blocks in which the data blocks are laid out in a reorganized region 23 in a serial fashion in the order of their access frequency. The most frequently accessed data blocks 20 are laid next to each other on the disk to minimize the distance the read/write head must travel to access the blocks. The next groups of frequently accessed blocks 21 and 22 are also grouped together as shown. The access to blocks 21 is less frequent than blocks 20, and the access to blocks 22 is less frequent than blocks 21.

FIG. 3 illustrates a prior art reorganization of the data blocks in an organ-pipe fashion. The most frequently accessed blocks 30 are laid out at the center of the reorganization region. The next frequently accessed blocks are laid out on each side of blocks 30 as blocks 31 and blocks 32. The even less frequently accessed blocks 33 and 34 are at the ends of the reorganization region, as shown.

The problem with these prior art approaches is that contiguous data that used to be accessed together could be split up. More important, the access sequence typically exhibits some spatial locality even before the blocks are reorganized. Once the aggressive read-ahead or sequential prefetch commonly performed by the disk today is taken into account, the previously proposed reorganization techniques are seen to reduce seek distance at the far greater cost of rendering the prefetch ineffective.

FIG. 4 illustrates another prior art reorganization of the data blocks by laying out the identified hot data in increasing order of their original address, i.e., a sequential layout. The blocks 40–42, which have different access frequency, are reorganized according to their sequential addresses. See, for example, "Adaptive Block Rearrangement," Akyurek et al., ACM Transactions on Computer Systems, Vol. 13, No. 2, pages 89–121, May 1995. The problem with this technique is that the result is sensitive to the original block layout, especially to user/administrator actions such as the order in which workloads are migrated or loaded onto the disk.

More recently, the idea of packing data blocks that are likely to be used together into a larger superunit, have been investigated by Matthews et al. in "Improving The Performance of Log-Structured File Systems With Adaptive Methods," Sixteenth ACM Symposium on Operating System Principles (SOSP '97), 1997. In this study, the superunits are not ordered nor are the blocks within each superunit. Without ordering the data blocks, the effect of such clustering is merely to move related blocks close together to reduce the seek distance.

The above-mentioned prior art focuses mainly on reducing only the seek distance. This is not very effective at improving disk performance since it does not affect rotational latency, which constitutes about half of the disk access time. Moreover, any seek, regardless of distance, is a costly operation because of inertia and head settling time. With faster and smaller-diameter disks, the time difference between a short seek and a long seek is further diminished.

Others have also considered laying out blocks in the sequence that they are likely to be used. See, for example, the "Intel Application Launch Accelerator" by Intel Corporation, http://www.intel.com/ial/ala. However, this accelerator relies on external knowledge to identify patterns that are likely to be repeated, requiring for instance, operating system support or software vendors to preoptimize their applications. It does not automatically detect repeated sequences from the access sequence of a real workload.

There has also been recent work on identifying blocks or files that are accessed together so that the next time a context is recognized, the files and blocks can be prefetched accordingly. An example of this work is described by Kroeger et al. in "Predicting File System Actions From Prior Events," Proceedings of the USENIX 1996 Annual Technical Conference, pages 319–328, January 1996. The effectiveness of this approach, however, is constrained by the amount of locality that is present in the request stream, by the fact that it does not improve fetch efficiency and by the tendency for I/O requests to arrive together, which makes it difficult to prefetch in time.

Various heuristics have also been used to lay out data on disk so that items (e.g., files) that are expected to be used contemporaneously are located close to each other. The shortcoming of these techniques is that they are based on static information such as name space relationships of files, which may not reflect the actual access behavior. Furthermore, files become fragmented over time. The blocks belonging to individual files can be gathered and laid out contiguously in a process known as defragmentation as described by McDonald et al. in "Dynamically Restructuring Disk Space For Improved File System Performance," Technical Report 88–14, Dept. of Computational Science, University of Saskatchewan, Saskatchewan, Canada, July 1988. But defragmentation does not handle inter-file access patterns and its effectiveness is limited by the file size which tends to be small. Moreover, defragmentation assumes that blocks belonging to the same file tend to be accessed together which may not be true for large files or database tables, and during an application launch when many seeks remain even after defragmentation.

Therefore, there remains a need for a storage system and method for reorganizing data to effectively increase performance without the above-described disadvantages.

SUMMARY OF THE INVENTION

The invention relates to an autonomic storage system that continually analyzes input/output (I/O) request patterns to optimize the layout of data on a storage device, such as a disk drive, to increase the system performance. It is motivated by technology trends that is causing computer systems to be increasingly bottlenecked by I/O and the fact that managing the performance of disk-based storage has become progressively complicated and expensive. The invention is based on the observation that although disk access time has been relatively stable, disk transfer rate has been increasing dramatically. The invention reorganizes selected data units, such as data blocks on a disk, to improve the spatial locality of data requests, and hence leverage recent significant improvements in disk transfer rate.

The invention determines which data blocks to reorganize and how to lay them out in a storage system based on the observation that workloads tend to have long sequences (or runs) of data requests that are repeated and only a relatively small portion of the data in a storage system is in active use at any time. The former is exploited by analyzing the request stream to discover the repeated sequences from among the intermingling requests for data. The data units in the resulting sequences are laid out sequentially, i.e., being reorganized, in a reorganization region so that they can be effectively prefetched to service future requests. The latter is addressed by detecting data units that are frequently accessed and reorganizing them in such a way as to preserve the existing spatial locality of the data.

The main focus of the invention is to reduce the number of physical I/Os by improving sequentiality and thereby increasing the effectiveness of data read-ahead or sequential prefetch. This effect is not expected to diminish over time with disk technology trends. In addition, the invention increases I/O efficiency by reducing the seek distance.

In a preferred embodiment of the invention, the most repeatedly requested sequences of data units are determined by examining a graph that represents the request stream. Each vertex in the graph corresponds to a requested data unit. Each edge represents the fact that one data unit is requested shortly after another unit and a weight associated with the edge indicates the relative frequency of such an occurrence. Target sequences are identified from the graph based on the weights of the edges. A target sequence is grown into a desired sequence by gradually adding the data units associated with selected edges to the ends of the target sequence. The data units corresponding to the determined sequences are copied into a reorganization region and laid out according to these sequences. The copied data can be used to service future requests for data, thereby increasing the effectiveness of sequential prefetch and reducing the data seek time.

In another preferred embodiment of the invention, frequently requested data units are also determined and reorganized in the reorganization region to service future data requests. The reorganization region can accommodate N data units. The sequentially-addressed data units in the storage system are grouped into extents, each having a generally large number of units. The extents are sorted based on the frequency of request of the units in the extents. The N most frequently requested units in the sorted extents are copied into the reorganization region while the order of the sorted extents and the order of the sequential unit addresses in each extent are preserved. Data in the reorganization region can be used to service future requests.

In yet another preferred embodiment of the invention, both the frequently requested data units and repeatedly requested sequences of data are copied into the reorganization region. The copied data might be used to service future data requests.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention will be described primarily as a system and method for providing data consistency in a data storage system using a request processor and data modification information. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Although disk access time has been improving only slowly, the disk transfer rate has been increasing dramatically as a result of the increase in rotational speed and in linear recording density. Given the technology and industry trends, such improvement in the transfer rate is likely to continue, as is the almost annual doubling in capacity. One possible approach for increasing effective disk performance is to find ways to leverage the dramatic improvement in disk transfer rate and disk capacity. In particular, to replicate and reorganize data blocks on a disk based on the anticipation as to which data blocks are likely to be accessed next by the users (through host applications) and in what order.

Figure 1:
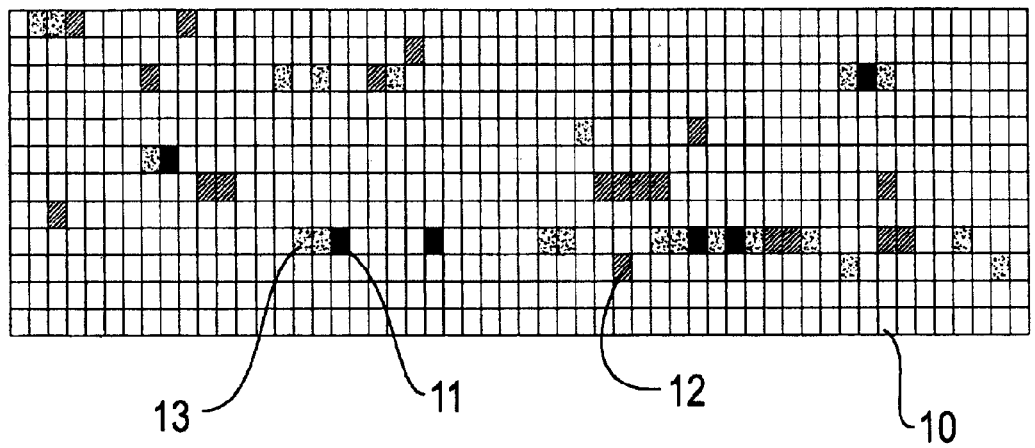
FIG. 1 is a representative layout of the data blocks in a storage device and their frequency of request.
Figure 2:
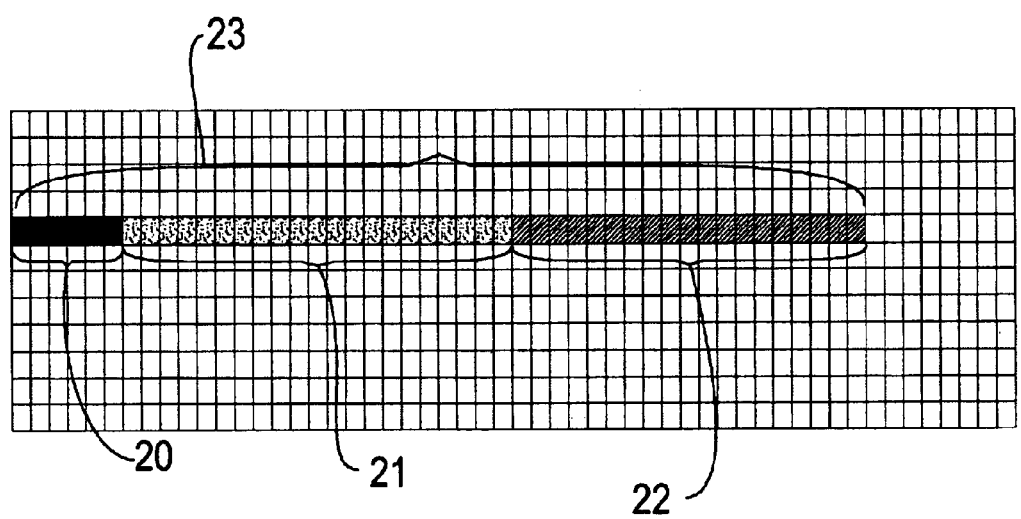
FIG. 2 illustrates a prior art serial reorganization of the data blocks.
Figure 3:
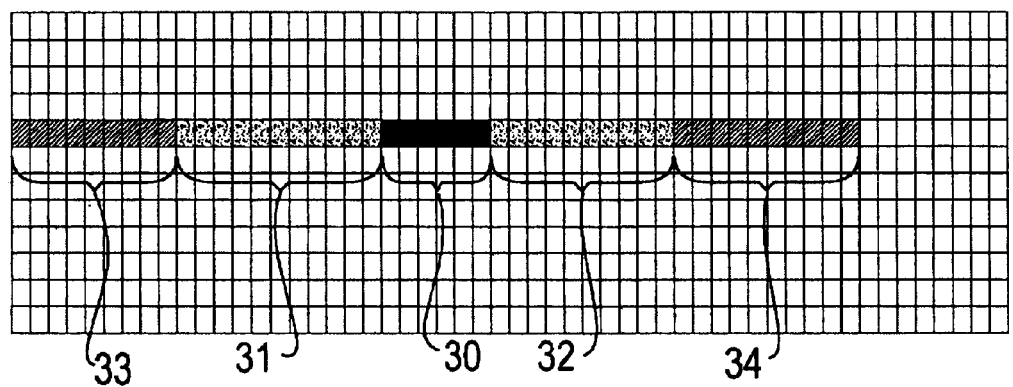
FIG. 3 illustrates a prior art organ-pipe reorganization of the data blocks.
Figure 4:
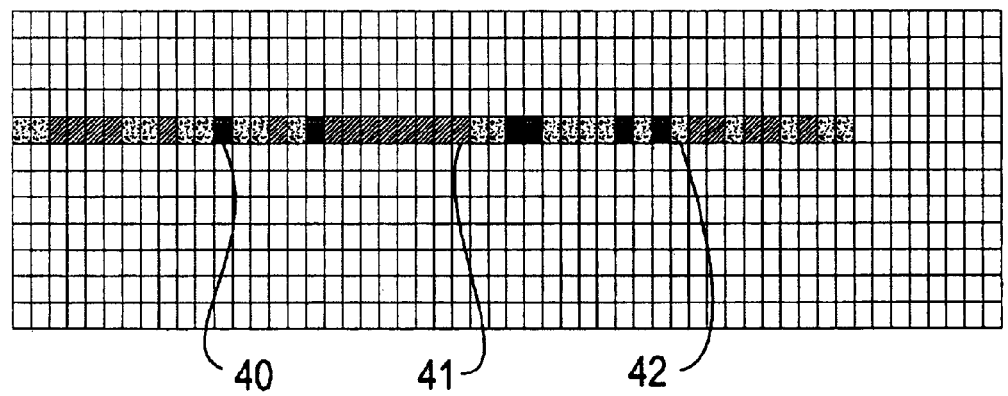
FIG. 4 illustrates a prior art sequential reorganization of the data blocks.
Figure 5:
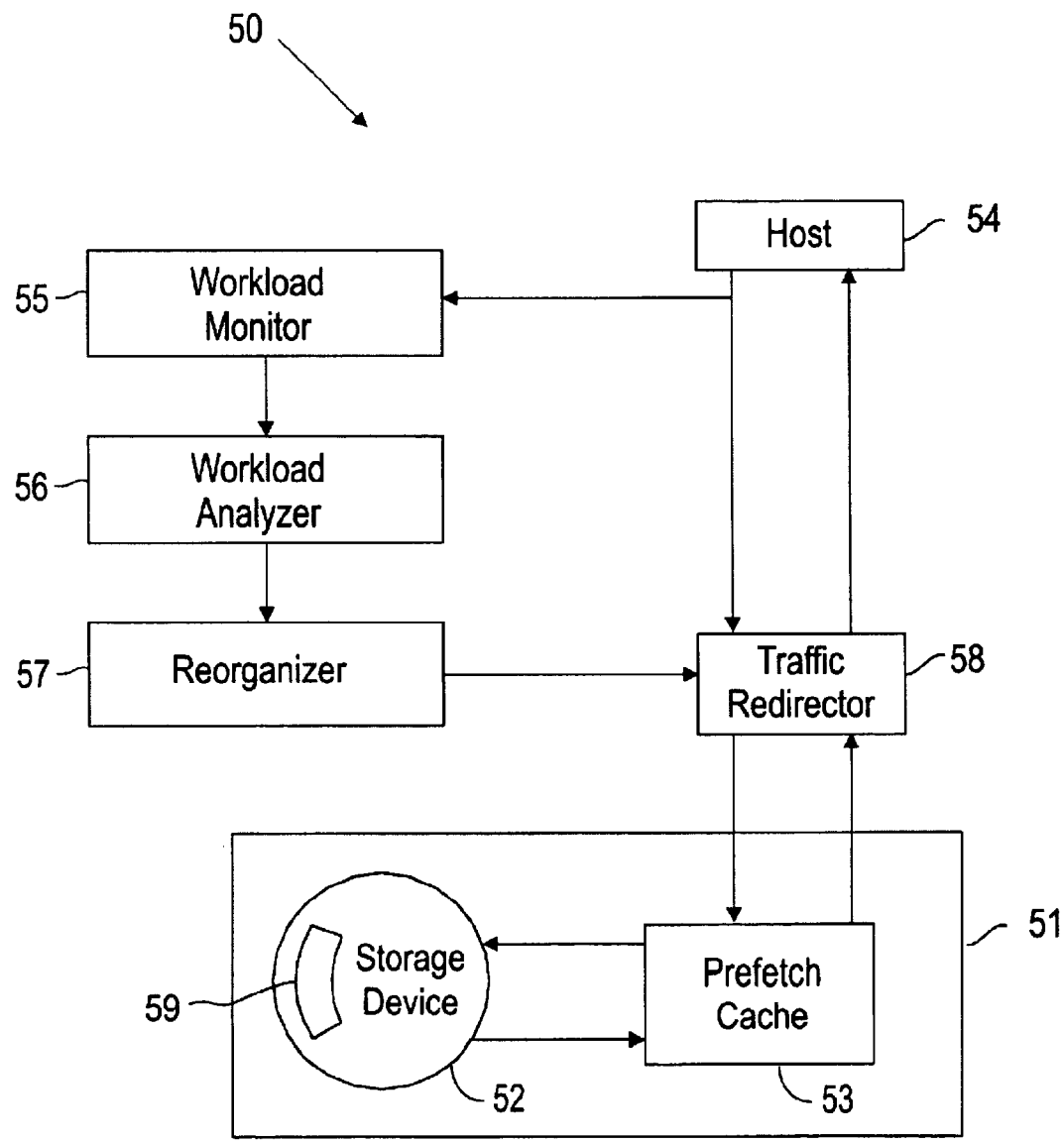
FIG. 5 is a block diagram of the storage system of the invention.

FIG. 5 is a block diagram showing a system 50 for performing the operations of the invention. The system 50 includes a data storage system 51 that includes one or more data storage devices 52, such as magnetic disks, and a sequential prefetch cache memory 53 into which data is prefetched from the device 52. The storage device 52 includes a data reorganization region 59. Data is typically stored on the device 52 as data blocks (or data sectors) of the same size. A user host application 54 accesses the data blocks by requesting them from the storage system 51. It is assumed that the system 50 can perform sequential I/O operations faster than random I/O operations. The system of the invention further includes a workload monitor 55, a workload analyzer 56, a data reorganizer 57, and a traffic redirector 58.

In accordance with the invention, the workload monitor 55 collects a trace of the addresses requested as the requests for data are serviced by the storage system 51. A trace is a list of all the requests in a request stream. The trace collection is a low overhead operation that involves logging a few bytes worth of data per request. Since the ratio of I/O traffic to storage capacity tends to be small, collecting such a trace is not expected to impose significant overhead. The collected data is written to disk periodically. To limit the amount of storage space devoted to storing the trace data, the storage space can be organized as a circular buffer so that the oldest trace data will be overwritten when necessary.

In the preferred embodiments of the invention, when the storage system 51 is relatively idle, the workload analyzer 55 examines the collected trace data to determine which data blocks should be reorganized and how they should be laid out. For example, the trace might be examined anywhere from once a day to once a week. The workload analyzer 56 has two main functions, each targeted at exploiting a different workload behavior. The first function of the workload analyzer 56 is based on the observation that there are often long request sequences, or runs, that are repeated. It tries to discover these runs to lay them out sequentially for effective prefetching. This data reorganization is referred to as "run clustering" and is discussed in detail below in reference to FIGS. 6–11. The second function of the workload analyzer 56 attempts to localize hot, i.e., frequently accessed, data in a process referred to as "heat clustering". Unlike other proposed techniques that might cause the request stream to lose the spacial locality property, the heat-clustering of the invention localizes hot data while preserving and sometimes, even enhancing spatial locality. Heat-clustering will be described later in reference to FIGS. 12–13.

Based on the results of the workload analysis, the reorganizer 57 makes copies of the selected blocks and lays them out in the determined order in the preallocated reorganization region 59. An analysis of several real workloads shows that a reorganized area of about 10–20% of the size of the data stored on a device 52 is sufficient to realize most of the benefit. The reorganization process can proceed in the background while the system 50 is handling other tasks. FIG. 5 further shows a traffic redirector 58 located on the I/O path between the host 54 and the storage system 51. The traffic redirector 58 determines whether a request can and should be satisfied from the reorganized region 59, and which copy to use if there are multiple up-to-date copies of the data in the reorganized area. In the preferred embodiment of the invention, only a subset of the data is replicated and relocated. Thus the traffic redirector 58 can be simply a look-aside table mapping only the data in the reorganized area 59.

Figure 6:
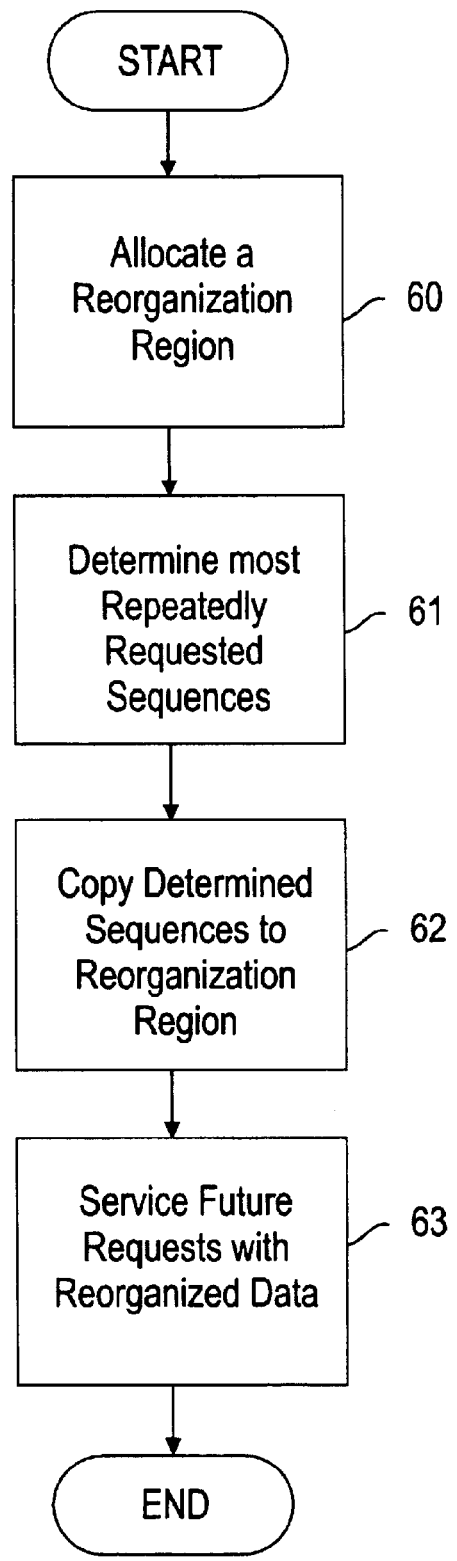
FIG. 6 is a flowchart showing the process of reorganizing data based on run-clustering in accordance with the invention.

FIG. 6 is a flowchart of the process for reorganizing the data based on repeated sequences of data requests. This process is referred to as run-clustering. At step 60, a reorganization region is allocated in the storage device. The most repeatedly requested sequences of data blocks are then determined from the incoming data request stream, in step 61. Next, the data blocks associated with the determined sequences are copied from their home location in the storage device into the reorganization region in the order of the determined sequences, in step 62. As a result, copies of the data blocks that are repeatedly requested in the sequences are now positioned next to each other in the reorganization region of the device and can be quickly accessed. Future requests for these data blocks can be efficiently serviced using the copied data in the reorganization, as shown by step 63. The process of analyzing the data request stream and copying the identified sequences of data into the reorganization region may operate continuously as a background task in the storage system.

As described later in the specification, there may be multiple copies of a data block in the reorganized region 59 of FIG. 5 because this block may appear in a "heat-clustered" region and in multiple runs (or sequences). If there are multiple up-to-date copies of a block in the storage device, then the decision of which copy to fetch, either the original or one of the duplicates in the reorganized region, can be made by estimating the proximity of the disk head to each of the copies and the expected prefetch benefit. A simple strategy that works well in practice is to give priority to fetching from the runs. If none of the identified repeatedly requested sequences matches the requested data, the heat-clustered data is used to service a data request, and if that fails, the original copy of the data is fetched from the device 52 into the sequential prefetch cache 53. In fetching from the runs, the traffic redirector 58 can decide which is the best run by matching up the contexts, i.e., by figuring out how many recently requested addresses are in each of the runs. In addition, if the number of recently requested addresses in a sequence falls below a predetermined value, the storage system may decide not to fetch from that sequence.

Note that the traffic redirector may affect the effectiveness of any cache 53 in the underlying storage system 51. Specifically, what was in the cache 53 might no longer be accessed because requests for those data could be redirected elsewhere. Also, in practice, the process of moving blocks around could change the contents of the cache 53. Thus after each block reorganization, the storage system 51 may work with the underlying cache 53 to remap its contents or prime the cache 53 by issuing reads to fill it with data that is likely to be accessed next.

For reliability, the table (or directory) used by the traffic redirector is stored and duplicated in known, fixed locations on the device 52. This on-device map is updated only during reorganization. When write requests occur, one or more copies of the data have to be updated. Any remaining copies are invalidated. The determination as to which copy or copies to be updated will be described later in the specification. It suffices here to say that such update and invalidate information is maintained in addition to the map. At the start of reorganization, any updated blocks in the reorganized area are copied back to the home or original area. Since there is always a copy of the data in the home area, it is possible to make the reorganization process resilient to power failures by using an intention list. With care, the reorganization can be performed while access to data continues. The on-device map is read on power-up and kept static during normal operation. The update or invalidate information is, however, dynamic. Losing the memory copy of the map is thus not catastrophic but having non-volatile storage (NVS) would make things simpler for maintaining the update/invalidate information.

Without NVS, a straightforward approach is to periodically write the update/invalidate information to the device 52. When the system 51 is first powered up, it checks to see if it was shut down cleanly the previous time. If not, some of the update/invalidate information may have been lost. The update/invalidate information in essence tracks the blocks in the reorganized area that have been updated or invalidated since the last reorganization. Therefore, if the policy of deciding which blocks to update and which blocks to invalidate is based on regions in the reorganized area, copying all the blocks in the update region back to the home area and copying all the blocks from the home area to the invalidate region effectively clears the update/invalidate information.

While the present description is focused on disks as the underlying storage device 52, it should be apparent that the invention is applicable to other forms of storage in which sequential data access is generally faster than random access. In addition, the invention is directly applicable to storage systems composed of individual disks, such as RAIDs. More generally, it should be apparent that this invention can be implemented at different levels in the storage hierarchy, including the file system, storage device driver, storage adaptor, storage controller, and the disk itself if predictions about embedding intelligence in disk systems materialize.

Run Clustering

An analysis of various workloads has revealed that the request stream typically contains long request sequences, or runs, that are often repeated. The presence of such sequences should not be surprising since computers are frequently used to perform the same tasks over and over again and each time a given task is performed, the same set of data blocks are read. FIG. 6 shows the general process for reorganizing the data based on the repeated long sequences of data blocks to improve prefetch effectiveness and to reduce data seek time. At step 60, a reorganization region is allocated, typically on the storage device itself. For a disk storage device, the reorganization region is preferably located in the middle of the disk surface between its inner edge and outer edge for best performance. The most repeatedly requested sequences of data blocks are then determined in step 61. The details for this operation are described below in reference to FIGS. 7–10. The determined sequences of data are next copied into the reorganization region in step 62. The copied data blocks in each sequence are arranged sequentially in the reorganization region with the expectation that they will be requested in sequence by the host. Future requests for data from the host might then be serviced using the copied data in the reorganization region in step 63.

Figure 7:
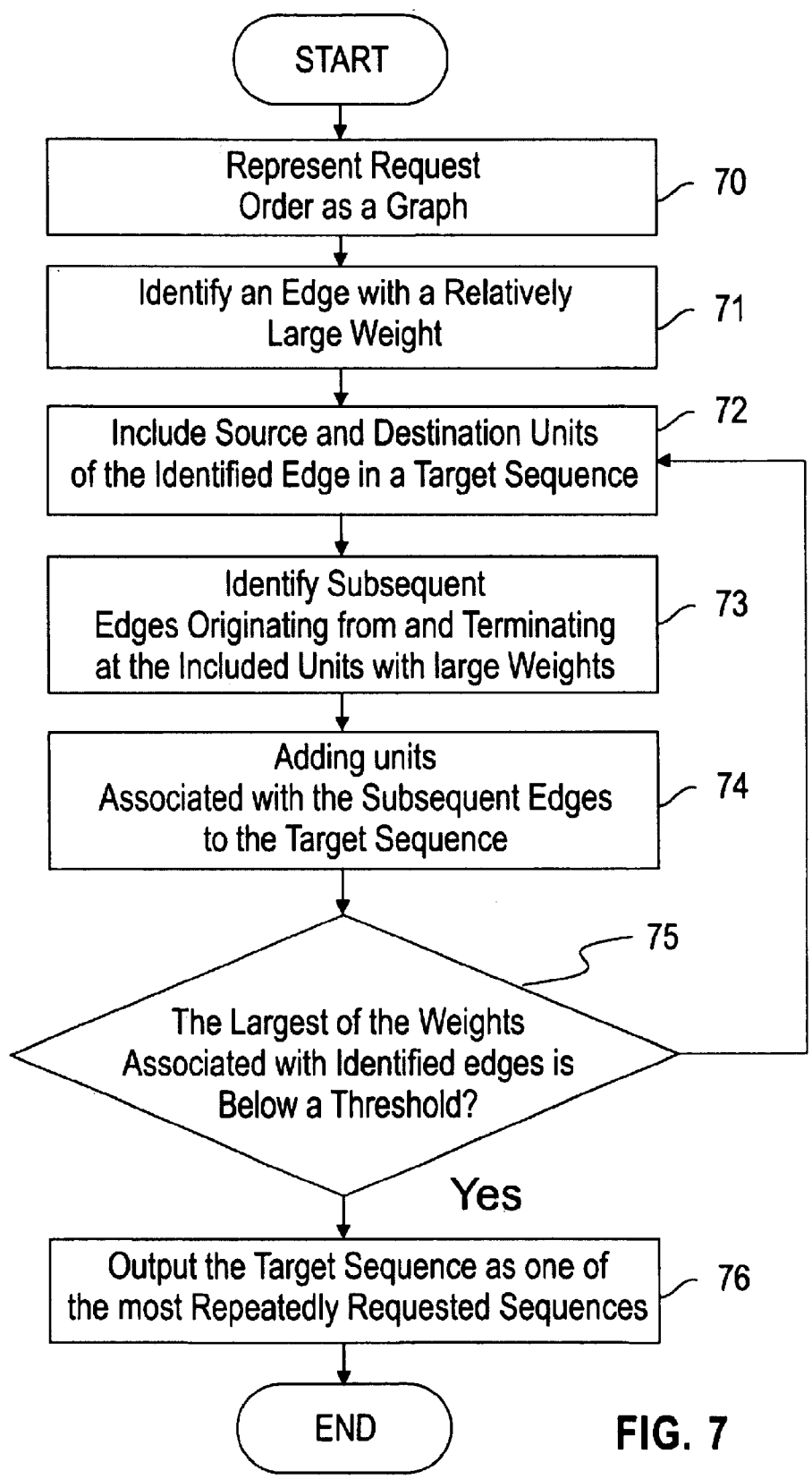
FIG. 7 is a flowchart showing the process for determining the repeatedly requested data sequences based on a graph, which is part of run-clustering, in accordance with the invention.

FIG. 7 shows a preferred process for identifying the most repeatedly requested sequences of data units that will be reorganized in the reorganization region. At step 70, the stream of data requests from the host are modeled as a graph where each vertex of the graph represents a data unit and each edge is a directed edge connecting two vertices. The originating and terminating vertices of an edge represent a source data unit and a destination data unit, respectively, where the destination data unit is requested some time after the source data unit is requested. A weight associated with each edge represents the frequency that the destination data unit is requested shortly after the source data unit is requested.

The data units can be of fixed size but it is more advantageous to let each data unit be the data accessed in a request. Such an approach reduces the likelihood for a request to be split into multiple I/Os. Furthermore, it increases prefetch effectiveness because it avoids internal fragmentation so that the resulting run contains only the data that is actually accessed. Moreover, this approach allows the same data block to appear in multiple runs, and helps to distinguish among different request sequences that include the same data block.

A straightforward approach for building the access graph is to set the weight of edge (i, j) equal to the number of times a destination data unit j is requested immediately after a source data unit i. However, this approach only addresses sequences that involve two data units. In addition, since the request stream at the storage level is typically noisy, a method for detecting the runs must be more discerning. For instance, requests from different tasks may be intermingled in multi-tasking and multi-user systems. Also, they may arrive out of order because of request scheduling or prefetch. One solution is to make the weight of edge (i, j) equal to the number of times the data unit j is requested within τ requests following a request of the data unit i, where τ is a predetermined number. For example, a weight of 3 means that there are three occurrences that the destination data unit is requested within a predetermined number of requests, say 10 requests, following the request of the source data unit.

Figure 8:
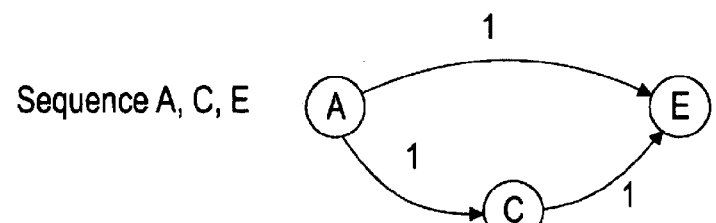
FIG. 8 illustrates a graph that represents the request sequence A, C, E based on run-clustering in accordance with the invention.
Figure 9:
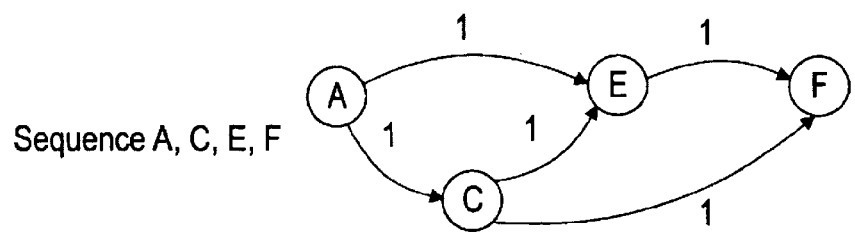
FIG. 9 illustrates a graph that represents the request sequence A, C, E, F based on run-clustering in accordance with the invention.
Figure 10:
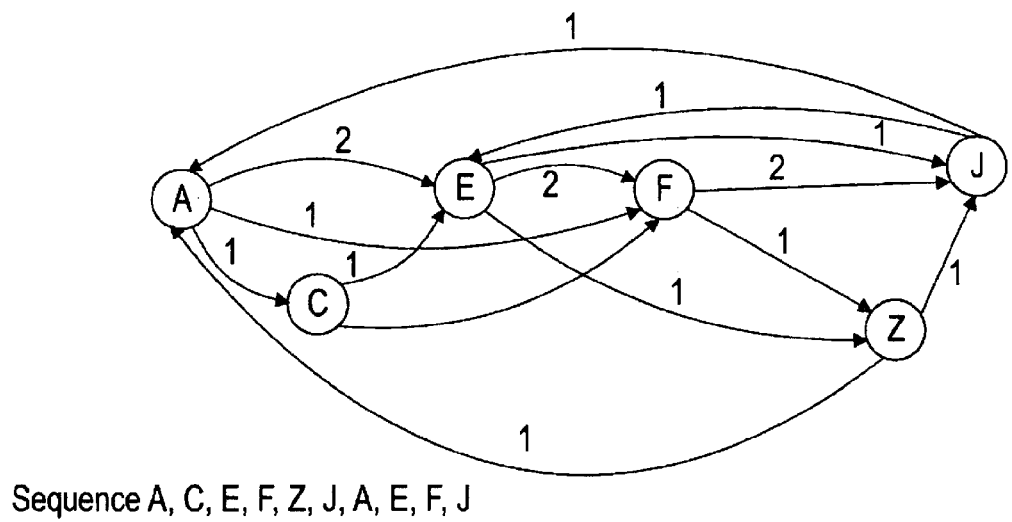
FIG. 10 illustrates a graph that represents the request sequence A, C, E, F, Z, J, A, E, F, J based on run-clustering in accordance with the invention.

As an example, FIG. 8 illustrates the graph that represents a sequence of three requests for data where the first request is for data unit A, the second request is for data unit C and the third request is for data unit E. The figure assumes a τ value of 2. FIG. 9 illustrates the graph when an additional request for data unit F is received after the request for data unit E. Observe that with a τ value of 2, edges are added from both data unit E and data unit C to data unit F. FIG. 10 illustrates the graph with an additional six requests for data in the sequence Z, J, A, E, F, J. The resulting graph has three edges of weight 2 among the other edges of weight 1. These edges of higher weight highlight the repeated sequence A, E, F, J. As shown in this example, the graph built in accordance with this invention enables the repeated sequences to be distinguished even when they are interspersed by other requests in the request stream.

In addition, to represent the actual sequence of data requests more accurately so as to increase the effectiveness of sequential prefetch, a graduated edge weight scheme might be used where an edge weight decreases as the distance between two requested data units increases, i.e., as there are more intermediate requests between when these two data units are requested. For instance, suppose $X_i$ denotes the data unit accessed by the i-th request. For each data unit $X_n$, an edge of weight $\tau-j+1$ from $X_{n-j}$ to $X_n$, where $j<\tau$, is added to the graph. More generally, the edge weight carries two pieces of information: the number of times a data unit is accessed within $\tau$ requests of another unit and the number of requests in between. Suppose f is a parameter that determines the fraction of edge weight devoted to representing sequence information. Then for each $X_n$ from $X_{n-j}$ to $X_n$ where $j<=\tau$, an edge of weight $1-f+f(\tau-j+1)/\tau$ is added to the graph.

Various pruning algorithms can be used to limit the size of the graph. A process that works well in practice is to remove the vertices or edges whose weight falls below some threshold, typically the 5th or 10th percentile. The weight of a vertex can be defined as the highest weight of any of its edges. This simple operation adds no additional memory overhead and preserves the ordering of the graduated weights assigned to represent request sequence. To reduce the graph build time and also the size, the request stream can be pre-filtered to remove requests that do not occur frequently. A graph of size less than 0.5% of the data size is found sufficient to realize most of the benefit of run clustering, and that this ratio decreases with the data size. If memory of this size is not available, a multiple-pass run clustering algorithm can be used to further reduce memory requirements. Also, note that in a storage system with multiple volumes or partitions, the volumes can be separately optimized.

To increase stability in the reorganization, the edge weights are adjusted such that $$Weight_{new}=\beta Weight_{current}+(1-\beta)Weight_{old}$$

where $Weight_{new}$ is the edge weight used for the reorganization, $Weight_{current}$ is the edge weight collected since the last reorganization and $Weight_{old}$ is the previous value of $Weight_{new}$. The parameter $\beta$ controls the relative weight placed on the current edge weight and those obtained in the past.

Returning to FIG. 7, the graph is next examined to identify the desired sequences. An edge with a relatively large weight is identified in step 71. The data units represented by the vertices of this edge are used to start a target sequence in step 82. This starting sequence is then grown into one of the desired sequences at step 73 by repeatedly identifying a vertex that is most strongly connected to either ends of the sequence, i.e., to either the head or the tail of the growing sequence. The head and tail of the sequence are, respectively, the first and last T members of the sequence.

Specifically, a first vertex is selected such that the sum of the weights of all its edges terminating in the head of the sequence is the highest, i.e., most strongly connected to the head of the sequence. A second vertex is also chosen such that the sum of the weights of all its edges originating from the tail of the sequence is the highest. If the sum of these edge weights for the first vertex is higher than that of the second vertex, the first vertex is added to the sequence as the first member of the sequence. Otherwise, the second vertex is added to the sequence as the last member of the sequence. This process of growing the sequence is repeated until the sum of the edge weights for both the first and second vertices falls below a predetermined threshold (step 75). At that point, the target sequence is output as a desired sequence of data units to be copied into the reorganization region. A variation of the process depicted in FIG. 7 is to output a target sequence whenever the sum of the edge weights for both the vertices are much lower than their previous values, say less than half. Note that after a vertex is added to the sequence, it is marked and excluded from other sequences. Intuitively, the process for growing the sequence follows the way the graph is built using a window of $\tau$ requests to discover the next vertex in the sequence. The steps 71 through 76 are repeated to identify other repeated long sequences in the graph which are then also copied into the reorganization region.

Another variation of the sequence identification process is to add the first vertex to the sequence only if among the edges originating at this vertex, the one with the highest weight terminates in the head of the sequence. Similarly, to add the second vertex to the sequence only if among the edges terminating at this vertex, the one with the highest weight originates in the tail of the sequence. Yet another variation is to allow multiple copies of a data unit to exist either in the same sequence or in different sequences. This is motivated by the fact that some data units, for instance those corresponding to shared libraries, may appear in more than one request pattern. The basic idea in this case is to not mark and exclude a vertex from further consideration by the sequence identification process after it has been added to a sequence. Instead, the edges that are used to include that particular vertex in the sequence are marked and removed from subsequent consideration by the sequence identification process.

Figure 11:
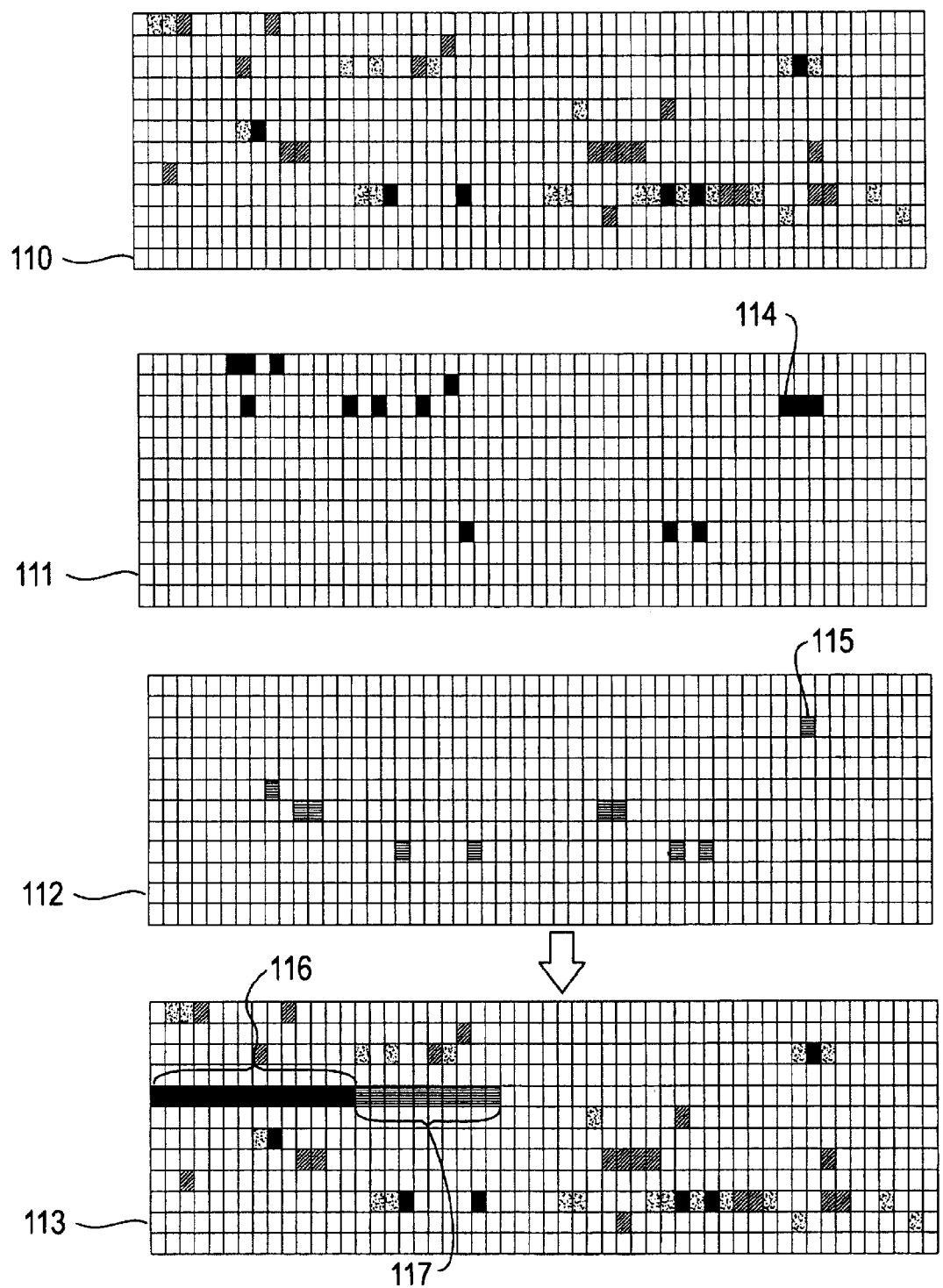
FIG. 11 illustrates an example of the reorganization of data based on run-clustering.

FIG. 11 illustrates how the data units are reorganized in the reorganization region based on the most repeatedly requested sequences that are identified from a graph. The data units as originally laid out in the device are shown in strip 110. In strip 111, the most repeatedly requested sequence that includes the data units 114 is identified from the graph. The next most repeatedly requested sequence is identified and shown in strip 112. This second sequence includes the data units 115. The identification of the most repeatedly requested sequences continues as described above in FIGS. 6–7, although only two sequences are shown in this example. The data units in the two identified sequences are then copied and laid out in sequence as shown in strip 113 of FIG. 11 as sequences 116 and 117.

Heat Clustering

Figure 12:
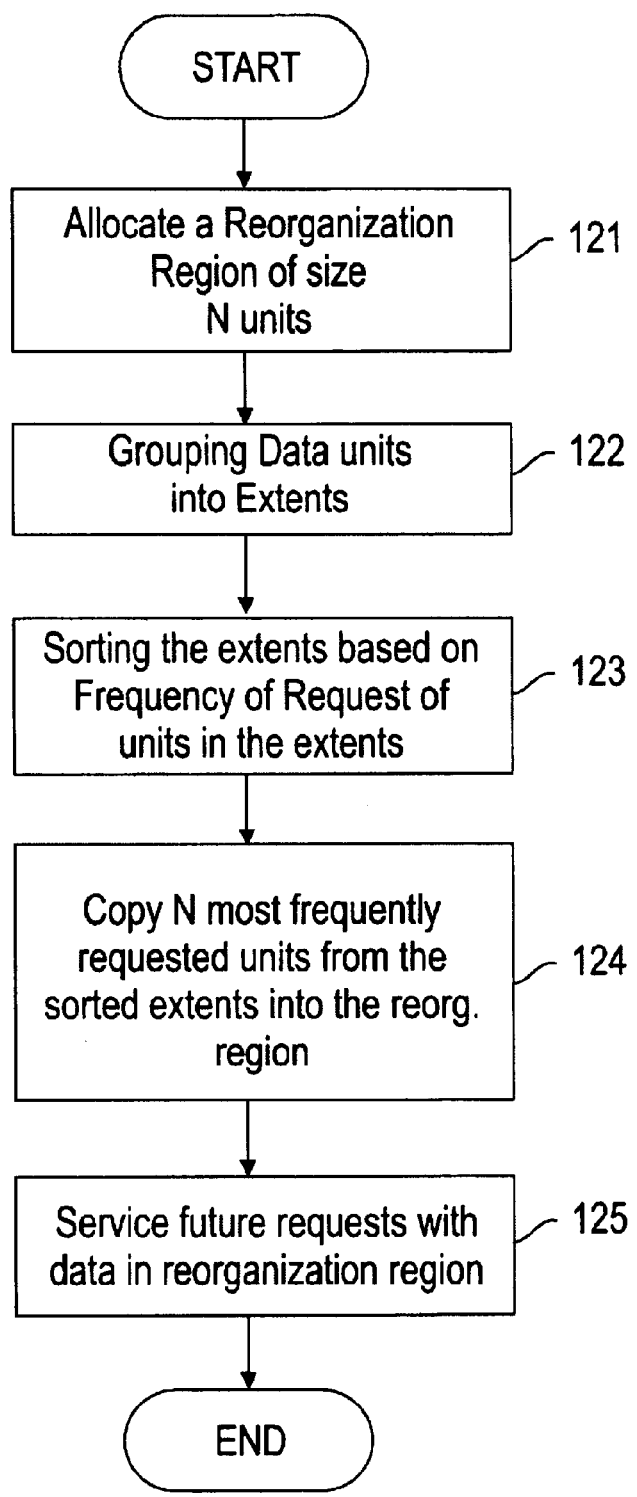
FIG. 12 is a flowchart showing the process of reorganizing data based on heat-clustering in accordance with the invention.

In addition to reorganizing data based on the most repeatedly requested sequences, the data may also be reorganized based on the most frequently requested data units for further improved performance. This is referred to as heat-clustering. FIG. 12 is a flowchart showing the process for this part of the invention. In step 121, a reorganization region is first allocated that can accommodate N data units. The data units of the storage device are grouped into extents where each extent includes a relatively large number of contiguous units. For example, in a disk storage device, each extent might have 1024 (1 K) data blocks. The data extents are sorted based on the frequency of request for the data units in the extents. In one preferred embodiment of the invention, the extents are sorted based on the most frequently requested unit in each extent. In another preferred embodiment, the frequency of access to all units in each extent is taken into account and the extents are sorted based on this frequency.

In step 124, the N most frequently requested data units are determined and copied into the reorganization region. These data units may be determined by examining a count of requests for each unit. Preferably, the storage system of the invention keeps a count of the number of requests for data directed to each data unit over a period of time. During the analysis, it first identifies the N data units with the highest frequency count, where N is the number of data units that can fit in the reorganization area.

The N most frequently requested data units are copied into the reorganization region while preserving the order of the sorted extents and the sequential order of units in each extent. That is, the sorted extents are examined in order and for each extent, the data units in that extent are examined in address sequence and are copied into the reorganization region if they are among the N most frequently requested data units. The data units in the reorganization region might then be used to service future host requests for data, in step 125.

Figure 13:
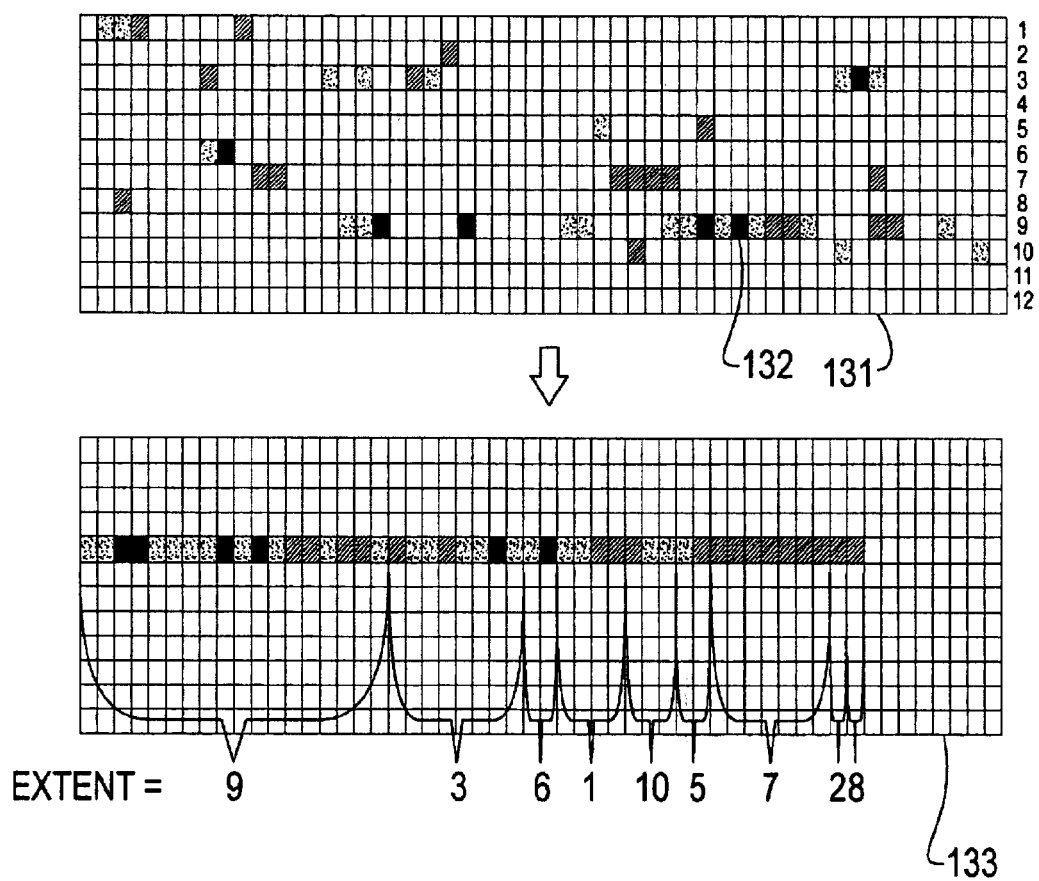
FIG. 13 illustrates a data reorganization based on heat-clustering in accordance with the invention.
Figure 14:
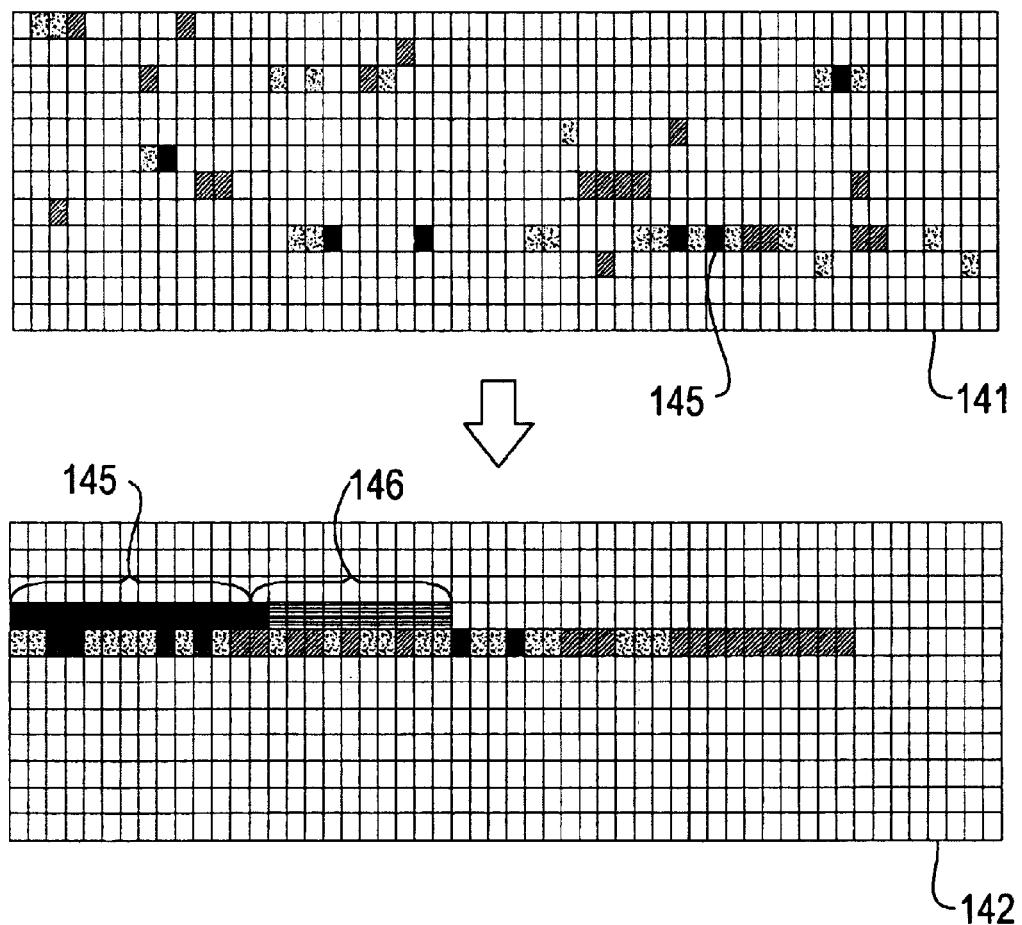
FIG. 14 illustrates a data reorganization based on both run-clustering and heat-clustering in accordance with the invention.

FIG. 13 shows an example of the layout of the data units before and after they are reorganized based on the frequency of requests in accordance with the invention. As illustrated by the original layout 131, the most frequently requested data units 132 are scattered throughout the storage device. Assuming that the extent size is a row of blocks in the figure, strip 133 shows the layout of the data units after the reorganization steps described above. First, the extents are sorted based on the frequency of access of data units in that extent. This results in the following sorted extent list: 9,3,6,1,10,5,7,2,8. Next, the data units in each of the sorted extents are examined using the address sequence. If a data unit is among the identified frequently requested data units, it is copied into the reorganized region. As shown in FIG. 13, there are 18 units in extent 9 that are among the identified frequently requested units. These are copied into the reorganized region in their address sequence. Next, extent 3 is examined and 8 units are found to be among the identified frequently requested units. These units are copied into the reorganized region in the address sequence and the process continues.

The main effect of the heat clustering process described above is to reduce seek distance without decreasing prefetch effectiveness. By moving frequently accessed data together largely in order of their addresses, the invention significantly improves data prefetching. As discussed in the background section, there have been attempts to improve spatial locality in storage systems by clustering hot, i.e., frequently requested, data. However, the prior art techniques have failed to recognize that spatial locality exists in the request stream and ends up destroying it, and as a result substantially degrading the performance of the storage system.

In another preferred embodiment of the invention, both the repeatedly requested sequences of data units and frequently requested units are used to reorganize the data. By combining run clustering and heat clustering, practically most of the requests for data might be serviced from the reorganization region. This allows the performance of the system to be improved dramatically and at the same time be relatively predictable with regard to the placement of the reorganization region. The reorganization region can be partitioned between heat and run clustering, but in practice, sharing the reorganization region between heat and run clustering with the runs being allocated first works well.

Whenever the host requests to write a data unit to the storage system, it is preferred that the request count for this unit be updated in the heat clustering. However, in run clustering, it is preferred that the graph be built based only on read requests. As to which copies of the data units must be updated and which copies must be invalidated in a write request, the exact policy to use can be decided on an individual write and copy basis by looking at the expected future benefit of updating each of the copies. For instance, by looking at the expected probability that the unit will be read in a particular sequence before it is updated again. Studies have shown that data units that are updated will tend to be updated again rather than read. Thus only one of the copies should be updated and the other copies invalidated. Another policy is to update all the copies in the run-clustered portion of the reorganized area. If a data unit does not exist in the run-clustered region, that unit in the heat-clustered region would be updated. If the unit does not exist anywhere in the reorganized area, the original copy in the home area is updated.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for reorganizing data in a storage device for improved performance, the device storing data as data units, the method comprising the steps of:

allocating a reorganization region;

determining a plurality of most repeatedly requested sequences of units, the units in the sequences being requested sequentially, wherein determining includes:

identifying an edge with a relatively large weight;

Including the source unit and destination unit associated with the identified edge in a target sequence;

Identifying subsequent edges originating from and terminating at the included units, each subsequent edge having a generally large weight;

adding the units associated with the subsequent edges to the target sequence, wherein the target sequence is output when the largest of the weights associated with the identified edges falls below a threshold; and Outputting the target sequence as one of the most repeatedly requested sequences;

copying the determined sequences into the reorganization region; and servicing requests for data using data in the reorganization region, wherein the data requests are represented as a graph having a plurality of vertices and edges, each vertex representing a data unit, each edge connecting a vertex representing a source data unit with a vertex representing a destination data unit, the edge being associated with a weight indicating a relative frequency of the destination unit being requested shortly after the source unit; and the most repeatedly requested sequences are determined using the graph.

2. The method as in claim 1 further comprising the steps of:

determining the units that are requested most frequently; and copying the determined units into the reorganization region to service the data requests.

3. The method as in claim 1, wherein each weight indicates the number of times the associated destination unit is requested within a predetermined number of requests after the source unit is requested.

4. The method as in claim 1, wherein each weight depends on the number of intervening requests between the time when the associated source unit is requested and the time when the associated destination unit is requested.

5. The method as in claim 1, wherein the step of determining the subsequent edges includes the steps of:
   selecting a first vertex where the total of the weights associated with the edges connecting the first vertex with a first few vertices in the target sequence is the highest;
   selecting a second vertex where the total of the weights associated with the edges connecting a last few vertices in the target sequence with the second vertex is the highest; and
   adding the units corresponding to the first and second vertices to the respective ends of the target sequence.

6. The method as in claim 5, wherein the first vertex is selected such that an edge having a highest weight and originating from the first vertex has one of the first few vertices in the target sequence as the corresponding destination vertex.

7. The method as in claim 5, wherein the second vertex is selected such that an edge having a highest weight and terminating at the second vertex has one of the last few vertices in the target sequence as the corresponding source vertex.

8. The method as in claim 1, wherein the target sequence is output when the target sequence reaches a predetermined length.

9. The method as in claim 1, further comprising the step of updating the data units affected by the reorganization when there is a request to write data to the device.

10. The method as in claim 9, wherein the step of updating includes the steps of:
    updating the data units outside the reorganization region;
    updating the copies of the most frequently requested units currently an the reorganization region; and
    updating the copies of the data units included in the determined most repeatedly requested sequences.

11. The method as in claim 1, wherein the step of servicing data requests includes the steps of:
    servicing the requests using the determined sequences in the reorganization region if the requested data is in the determined sequences;
    servicing the requests using the determined units in the reorganization region if the requested data is in the determined units but not in the determined sequences; and
    servicing the requests using the data units outside the reorganization region if the requested data is not in the reorganization region.

12. The method as in claim 11, wherein of the determined sequences is used to service the requests if said one sequence includes a highest number of recently requested data units.

* * * * *